(12) United States Patent
Brown

(10) Patent No.: US 12,408,778 B1
(45) Date of Patent: Sep. 9, 2025

(54) DRINK-LOCATING BAND

(71) Applicant: Mitzi Brown, Doylestown, PA (US)

(72) Inventor: Mitzi Brown, Doylestown, PA (US)

( * ) Notice: Subject to any disclaimer, the term of this patent is extended or adjusted under 35 U.S.C. 154(b) by 399 days.

(21) Appl. No.: 18/079,948

(22) Filed: Dec. 13, 2022

(51) Int. Cl.
*A47G 19/00* (2006.01)
*A47G 19/22* (2006.01)
*H04W 4/029* (2018.01)

(52) U.S. Cl.
CPC ........ *A47G 19/2227* (2013.01); *H04W 4/029* (2018.02); *A47G 2019/2238* (2013.01); *A47G 2019/2244* (2013.01)

(58) Field of Classification Search
CPC .......................... A47G 19/2227; H04W 4/029
See application file for complete search history.

(56) References Cited

U.S. PATENT DOCUMENTS

| | | | |
|---|---|---|---|
| 6,388,612 B1* | 5/2002 | Neher | G08B 25/016 63/3.1 |
| D636,760 S | 4/2011 | Cheng | |
| 10,213,032 B1 | 2/2019 | Fontaine-Cole | |
| 10,405,075 B2 | 9/2019 | Cheney | |
| 10,917,744 B2* | 2/2021 | Brice | H04W 4/023 |
| 11,043,086 B1* | 6/2021 | Daoura | G08B 21/24 |
| 11,185,179 B2 | 11/2021 | Zimbelman | |
| 2009/0058670 A1* | 3/2009 | Sweeney | G08B 21/24 340/686.1 |
| 2009/0160670 A1* | 6/2009 | Sipple | G08B 21/24 340/686.1 |
| 2014/0173439 A1* | 6/2014 | Gutierrez | H04L 43/10 715/738 |
| 2014/0372045 A1* | 12/2014 | Keski-Pukkila | A61B 5/742 702/19 |
| 2015/0003629 A1 | 1/2015 | Killan | |
| 2018/0239999 A1* | 8/2018 | Gayton | G06K 19/07713 |
| 2021/0312787 A1 | 10/2021 | Brown | |
| 2021/0386226 A1 | 12/2021 | Wood | |
| 2022/0218137 A1 | 7/2022 | Iverson | |

FOREIGN PATENT DOCUMENTS

WO 2020030895 2/2020

* cited by examiner

*Primary Examiner* — Erika A Washington
(74) *Attorney, Agent, or Firm* — Kyle A. Fletcher, Esq.

(57) ABSTRACT

The drink-locating band comprises a locator, a band, and a software application. The locator may detachably couple to a drink container via the band. The locator may be adapted to be activated by a user via the software application executing on a smart phone. Responsive to being activated, the locator may play an audio stream, may illuminate one or more visual indicators, or both in order to annunciate the location of the drink container. As non-limiting examples, the drink container may be a can, a cup, a glass, a bottle, a travel mug, an insulated cup or bottle, or a koozie. In some embodiments, the locator may provide location data associated with the drink container to the software application such that the software application may display the location of the drink container on the screen of the smart phone.

17 Claims, 5 Drawing Sheets

DRINK-LOCATING BAND

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

Background of the Invention

Field of the Invention

The present invention relates to the field of asset tracking, more specifically, a drink-locating band.

SUMMARY OF INVENTION

The drink-locating band comprises a locator, a band, and a software application. The locator may detachably couple to a drink container via the band. The locator may be adapted to be activated by a user via the software application executing on a smart phone. Responsive to being activated, the locator may play an audio stream, may illuminate one or more visual indicators, or both in order to annunciate the location of the drink container. As non-limiting examples, the drink container may be a can, a cup, a glass, a bottle, a travel mug, an insulated cup or bottle, or a koozie. In some embodiments, the locator may provide location data associated with the drink container to the software application such that the software application may display the location of the drink container on the screen of the smart phone.

An object of the invention is to locate a drink container that has been set down at an unknown location.

Another object of the invention is to provide a locator that may be detachably coupled to the drink container via a band and a software application executable on a smart phone that may activate the locator over a wireless channel.

A further object of the invention is to provide a sound transducer and a plurality of visual indicators on the locator that may be activated using the software application to annunciate the location of the dink container.

Yet another object of the invention is to provide a GPS chip within the locator that may be operable to report location data associated with the locator to the software application.

These together with additional objects, features and advantages of the drink-locating band will be readily apparent to those of ordinary skill in the art upon reading the following detailed description of the presently preferred, but nonetheless illustrative, embodiments when taken in conjunction with the accompanying drawings.

In this respect, before explaining the current embodiments of the drink-locating band in detail, it is to be understood that the drink-locating band is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the drink-locating band.

It is therefore important that the claims be regarded as including such equivalent construction insofar as they do not depart from the spirit and scope of the drink-locating band. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
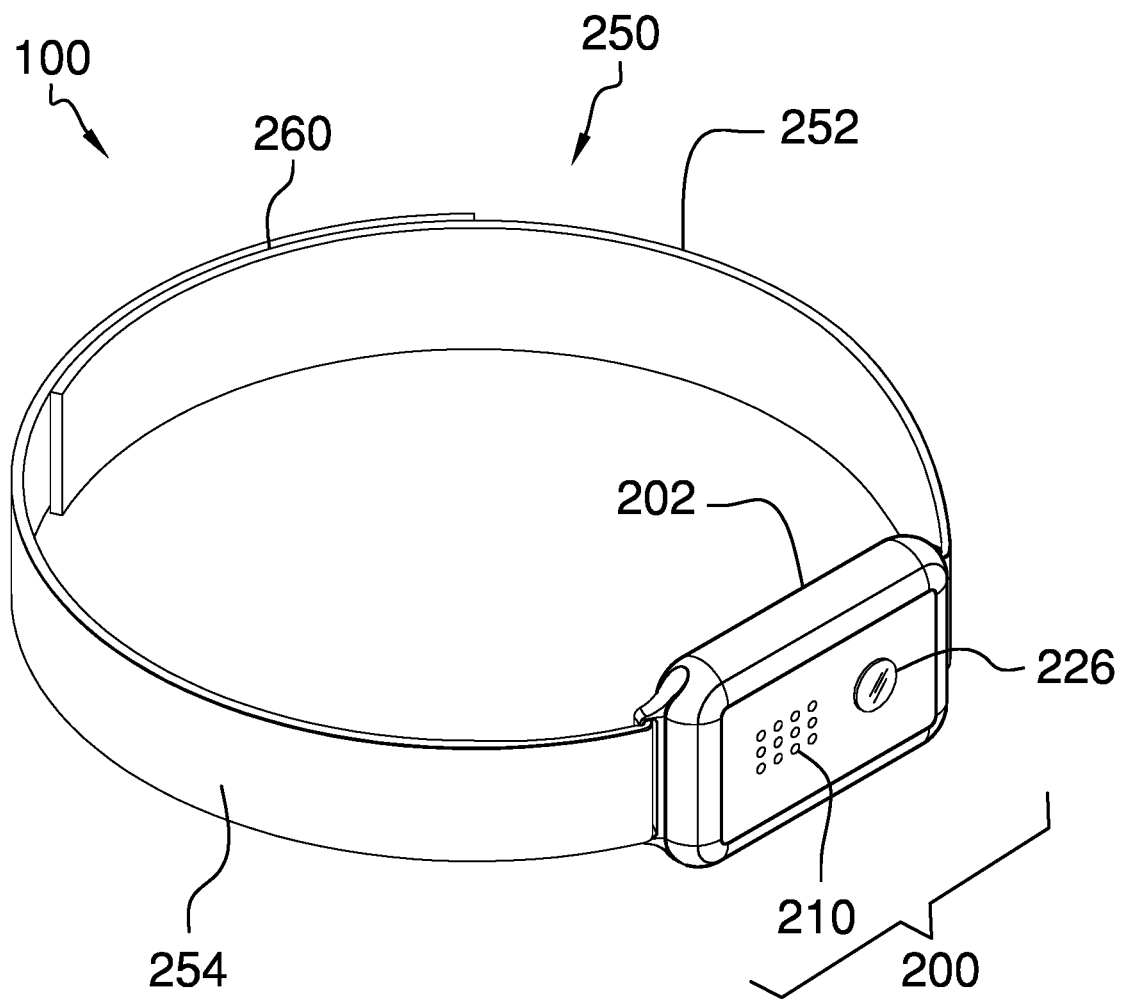
FIG. 1 is an isometric view of an embodiment of the disclosure illustrating a two-piece band.
Figure 2:
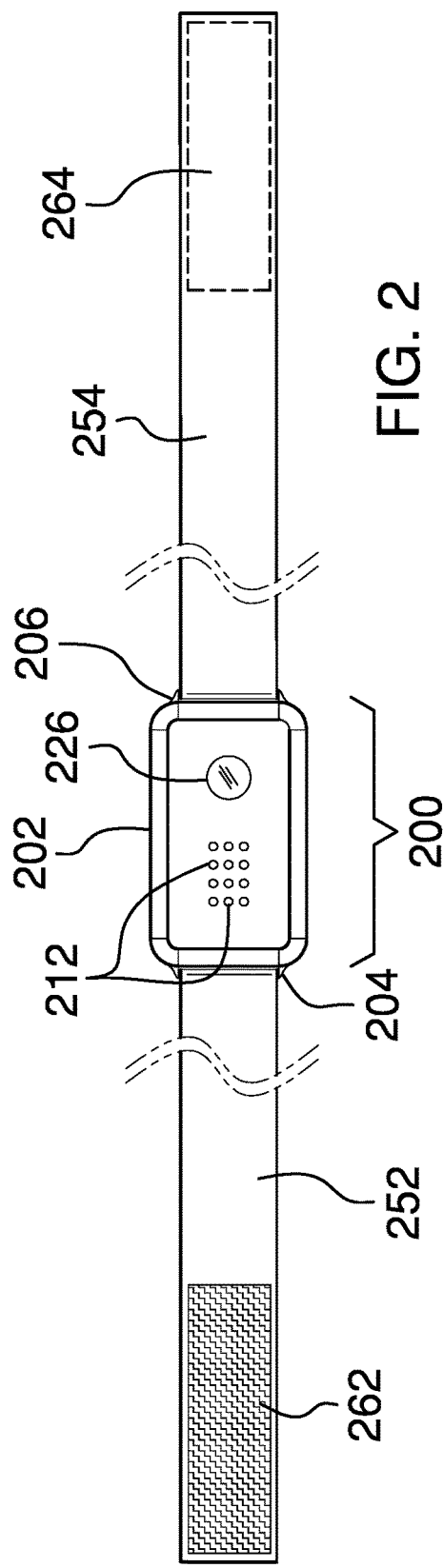
FIG. 2 is a front view of an embodiment of the disclosure.
Figure 3:
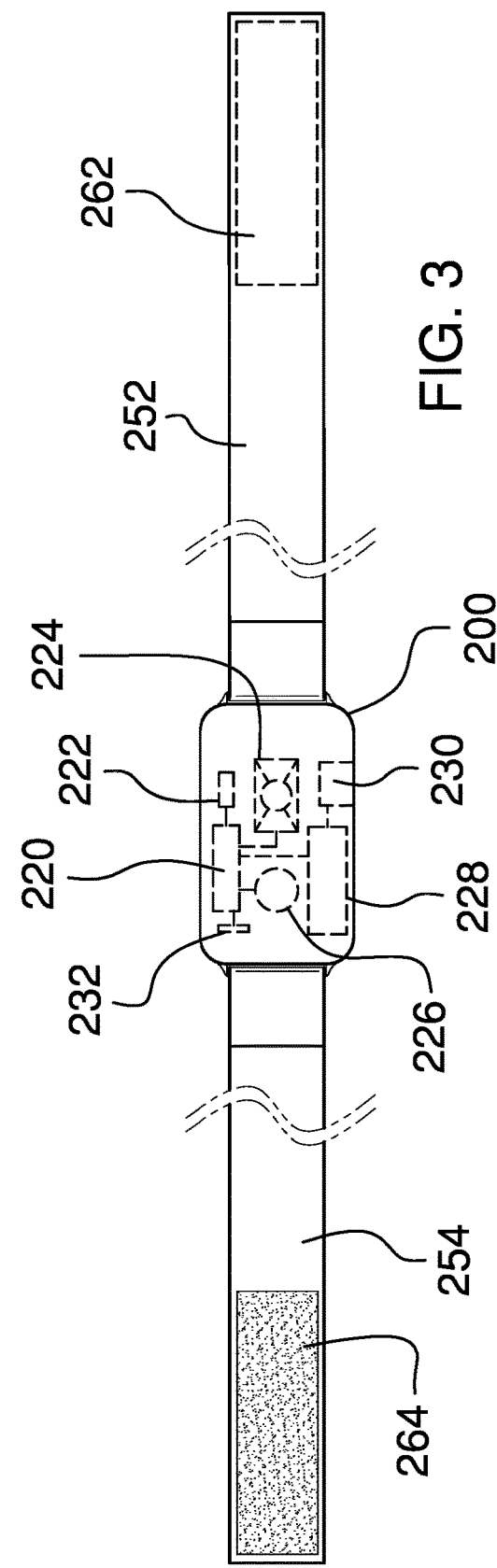
FIG. 3 is a rear view of an embodiment of the disclosure.
Figure 4:
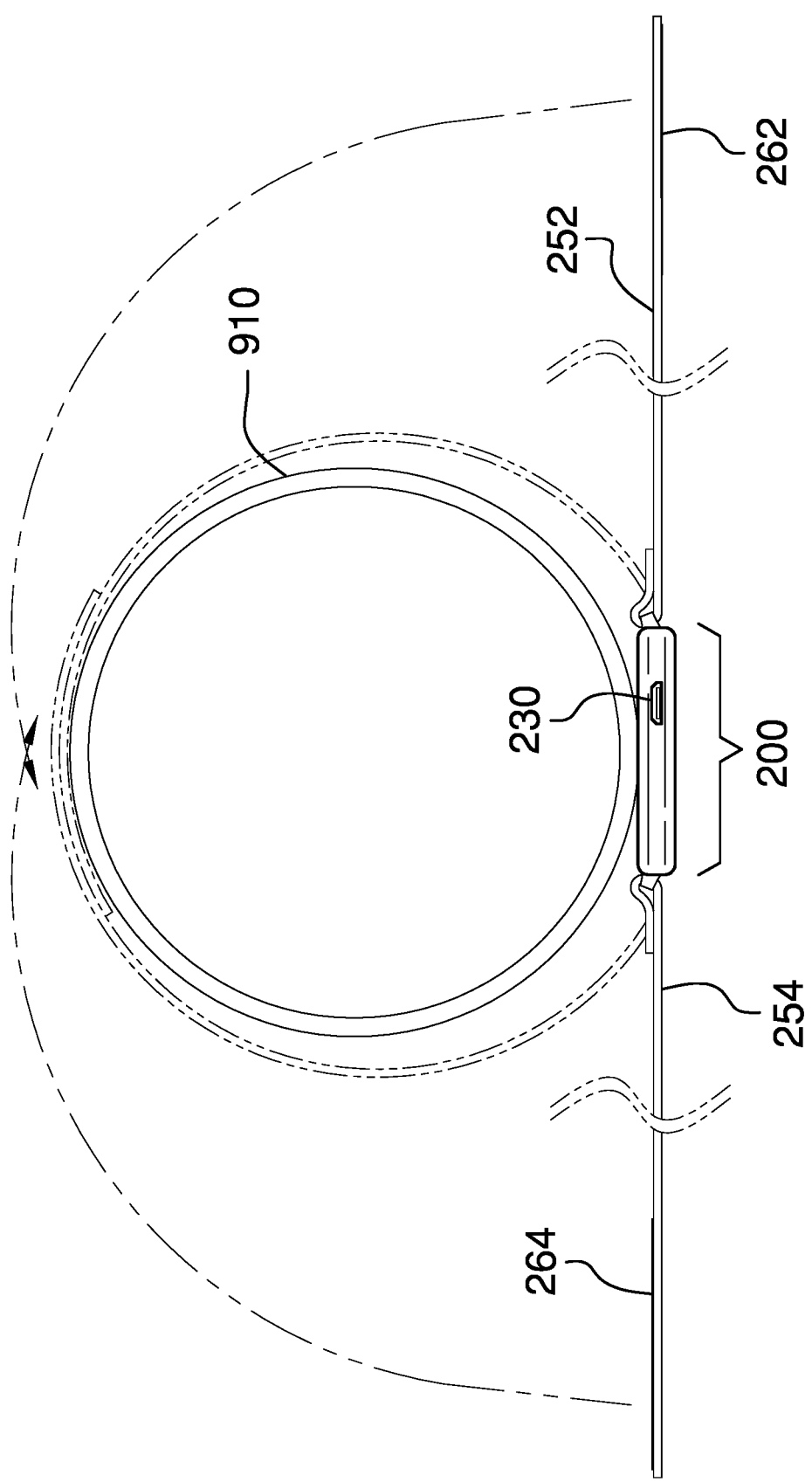
FIG. 4 is a bottom view of an embodiment of the disclosure.
Figure 5:
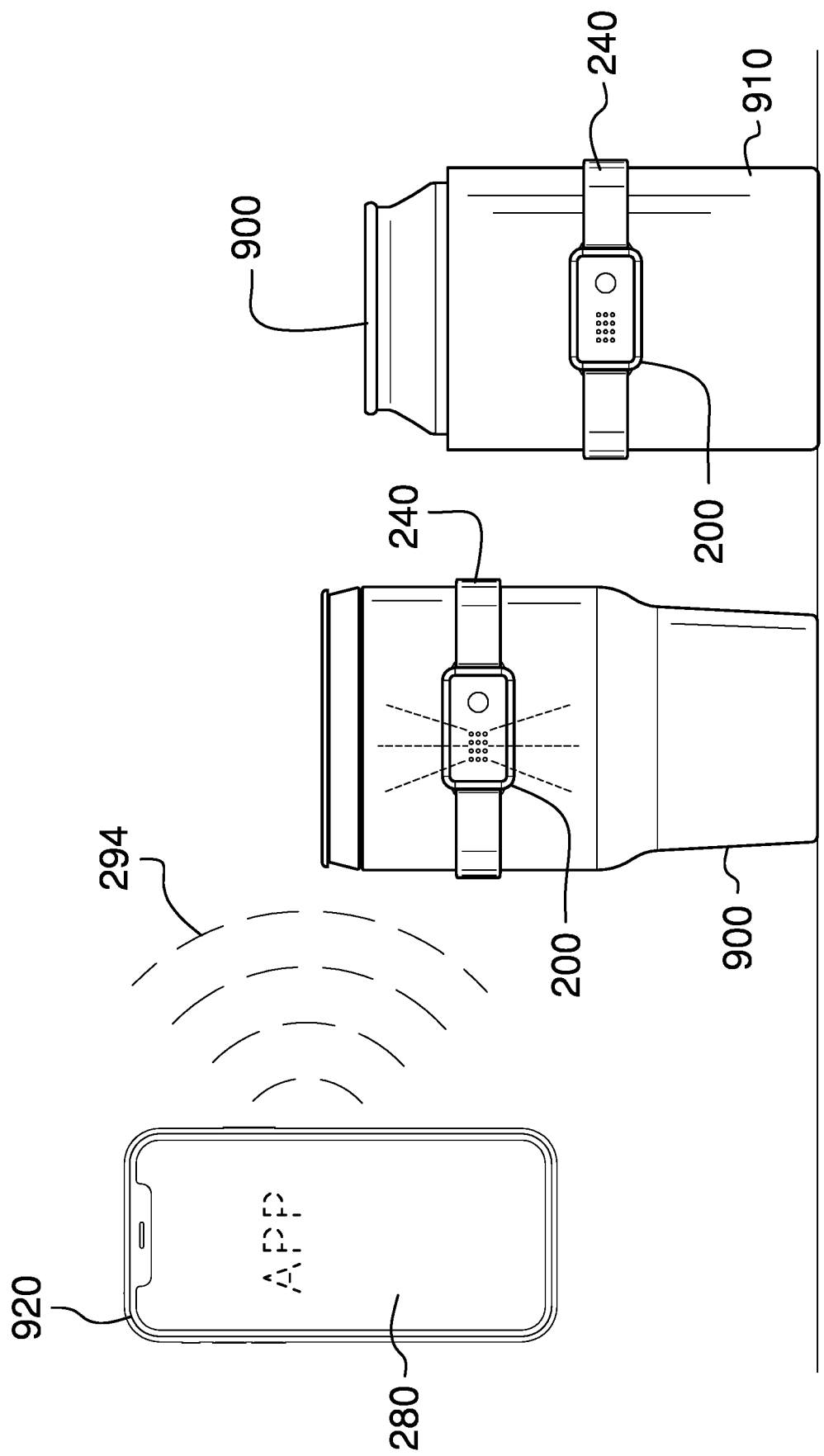
FIG. 5 is an in-use view of an embodiment of the disclosure.
Figure 6:
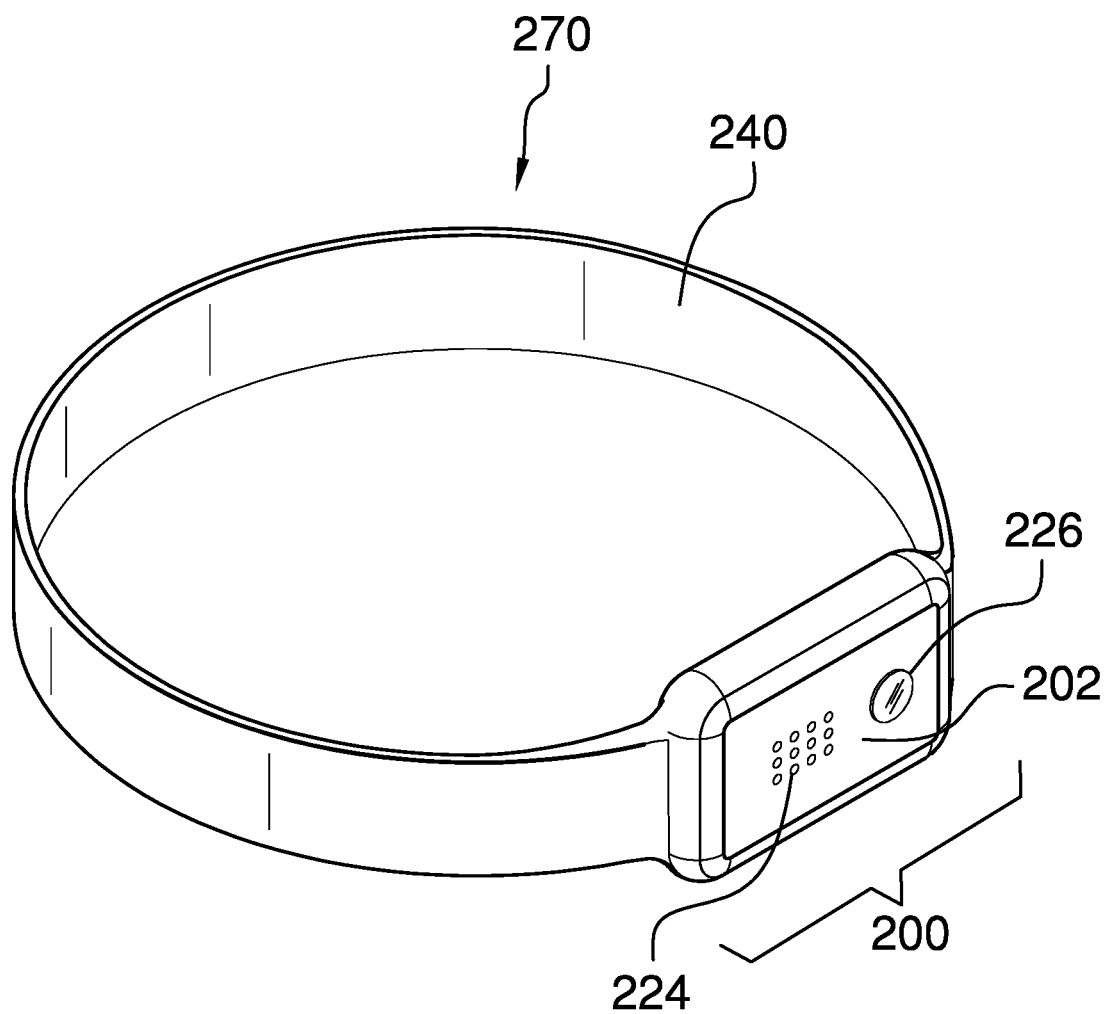
FIG. 6 is an isometric view of an alternative embodiment of the disclosure illustrating a one-piece band.

Detailed reference will now be made to a first potential embodiment of the disclosure, which is illustrated in FIGS. 1 through 6.

The drink-locating band 100 (hereinafter invention) comprises a locator 200, a band 240, and a software application 280. The locator 200 may detachably couple to a drink container 900 via the band 240. The locator 200 may be adapted to be activated by a user via the software application 280 executing on a smart phone 920. Responsive to being activated, the locator 200 may play an audio stream, may illuminate one or more visual indicators 226, or both in order to annunciate the location of the drink container 900. As non-limiting examples, the drink container 900 may be a can, a cup, a glass, a bottle, a travel mug, an insulated cup or bottle, or a koozie 910. In some embodiments, the locator 200 may provide location data associated with the drink container 900 to the software application 280 such that the software application 280 may display the location of the drink container 900 on the screen of the smart phone 920.

The locator 200 may comprise locator circuitry within a housing 202. The locator circuitry may comprise a microcontroller 220, a transceiver 222, a sound transducer 224, the one or more visual indicators 226, and a battery 228. The microcontroller 220 may be a central processing unit with memory and I/O ports. The microcontroller 220 may communicate with the transceiver 222, the sound transducer 224, and the one or more visual indicators 226 via the I/O ports. The microcontroller 220 may execute instructions stored within the memory of the microcontroller 220 to pair the transceiver 222 with the smart phone 920, to play the audio stream via the sound transducer 224, and to illuminate and extinguish the one or more visual indicators 226.

The transceiver 222 may be a wireless communication device. The transceiver 222 may pair with the smart phone 920 to send information from the locator 200 to the smart phone 920 and from the smart phone 920 to the locator 200 via a wireless communication channel 294. As non-limiting examples, the information may encode commands to the locator 200.

The sound transducer 224 may convert an electrical signal into the audio stream. As non-limiting examples, the sound transducer 224 may be one or more loudspeakers or one or more piezoelectric transducers. The electrical signal may be modulated by the microcontroller 220. Responsive to an activation command received from the smart phone 920, the microcontroller 220 may play the audio stream through the sound transducer 224. The audio stream may exit the housing 202 via a grill 210 located on the housing 202. In some embodiments, the grill 210 may be a plurality of grill apertures 212.

The one or more visual indicators 226 may be one or more LEDs. Responsive to the activation command received from the smart phone 920, the microcontroller 220 may illuminate the one or more visual indicators 226, extinguish the one or more visual indicators 226, vary the brightness of the one or more visual indicators 226, or any combination thereof. The one or more visual indicators 226 may be visible from outside of the housing 202. The audio stream and the one or more visual indicators 226 may be deactivated by explicit command from the smart phone 920 or after expiration of a predetermined timeout.

The battery 228 may comprise one or more energy-storage devices. The battery 228 may be a source of electrical energy to operate the microcontroller 220, the transceiver 222, the sound transducer 224, and the one or more visual indicators 226. The battery 228 may be recharged via a recharging port 230. In a preferred embodiment, the recharging port 230 may be a female Type C USB connector.

In some embodiments, the locator circuitry may further comprise a GPS chip 232. The GPS chip 232 may be a Global Positioning System receiver. The GPS chip 232 may receive a plurality of radio signals from satellites in the constellation of GPS satellites. The GPS chip 232 may perform calculations to determine geolocation and time information. The GPS chip 232 may deliver the geolocation information, the time information, or both to the microcontroller 220. Responsive to a locate command received from the smart phone 920, the locator 200 may send the location data derived from the geolocation information to the software application 280 executing on the smart phone 920. The software application 280 may display the location data on the screen of the smart phone 920 as a direction and distance to the locator 200, overlaid on a map, or both.

The band 240 may hold the locator 200 in place on the drink container 900. In some embodiments, the band 240 may be a two-piece band 250. The two-piece band 250 may comprise a first band portion 252 coupled to a first lug 204 of the housing 202 via a first pin and a second band portion 254 coupled to a second lug 206 of the housing 202 via a second pin. The free ends of the first band portion 252 and the second band portion 254 may overlap and detachably couple via a hook and loop fastener 260. As a non-limiting example, a hook portion 262 may be coupled to the front face of the first band portion 252 and a loop portion may be coupled to the rear face of the second band portion 254.

In some embodiments, the band 240 may be a one-piece band 270. The one-piece band 270 may be made of an elastic material that may stretch during installation and removal of the invention 100. The one-piece band 270 may surround at least the rear and four contiguous sides of the locator 200, leaving the front of the locator 200 exposed. As non-limiting examples, the one-piece band 270 may be made of natural or synthetic rubber, silicone, or neoprene. The one-piece band 270 may be selected from a plurality of sizes to fit a specific size of the drink container 900.

The software application 280 may execute on the smart phone in order to control and/or monitor status of the locator 200. The software application 280 may present a user interface on the screen of the smart phone 920. The software application 280 may be adapted for the user to send the commands to activate and deactivate the sound transducers 224 and the one or more visual indicators 226, to select a specific audio track to play through the sound transducers 224, and to acquire and display the location data for the locator 200.

In use, a locator 200 may be detachably coupled to a drink container 900 by placing the band 240 around the drink container 900. A user may carry the drink container 900 with them and may set the drink container 900 down. If the user forgets where the drink container 900 was placed, the user may run the software application 280 on the smart phone 920 to activate the sound transducers 224 and the one or more visual indicators 226. The sound transducers 224 and the one or more visual indicators 226 may annunciate the location of the drink container 900 such that the user may find the drink container 900. In some embodiments, the user may use the software application 280 to select a specific audio track to play via the sound transducers 224 on the locator 200. In some embodiments, the user may use the software application 280 to request that the locator 200 send location data. Responsive to the location data request, the locator 200 may acquire the location data from the GPS chip 232 and send the location data to the smart phone 920. The software application 280 on the smart phone 920 may present the location data on a map or as a direction and distance display.

DEFINITIONS

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, the words "couple", "couples", "coupled" or "coupling", may refer to connecting, either directly or indirectly, and does not necessarily imply a mechanical connection.

As used herein, the words "data" and "information" may be used interchangeably to refer to raw, unprocessed facts and to facts that have been processed, structured, organized, or presented in a context that makes the facts useful.

As used in this disclosure, "elastic" may refer to a material or object that deforms when a force is applied to stretch or compress the material and that returns to its relaxed shape after the force is removed. A material that exhibits these qualities is also referred to as an elastomeric material.

As used in this disclosure, a "fastener" may be a device that is used to join or affix two objects. Fasteners may generally comprise a first element which is attached to the first object and a second element which is attached to the second object such that the first element and the second element join to affix the first object and the second object. Common fasteners may include, but are not limited to, hooks, zippers, snaps, clips, ties, buttons, buckles, quick release buckles, or hook and loop fasteners.

As used herein, "GPS" may refer to a device that uses signals received from a system of navigational satellites to determine the position of the device. GPS is an acronym for Global Positioning System.

As used in this disclosure, a "hook and loop fastener" may be a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks may couple to the plurality of loops securely fastening the hook surface to the loop surface. The hook surface may sometime be referred to as a hard side fastener and the loop surface may sometimes be referred to as a soft side fastener.

As used in this disclosure, a "microcontroller" may be a small computer, often on a single integrated circuit, containing a processor core, memory, and programmable input/output peripherals.

As used herein, "pair", "paired", and "pairing" may refer to a connection established between two wireless devices or to the process of establishing such a connection.

As used herein, the terms "processor", "central processor", "central processing unit", "CPU", or "microprocessor" may refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used herein, "smart phone" or "smartphone" may refer to a personal communication device that incorporates cellular phone calling and texting capabilities along with advanced features. Non-limiting examples of the advanced features of a smart phone may include camera functions, multimedia functions (such as music and video recording and playback and gaming), internet functions (such as web browsing and file uploading/downloading), and Global Positioning System capabilities. A smartphone may be able to execute downloaded application programs that expand the capabilities of the smartphone.

As used in this disclosure, a "speaker" may be an electrical transducer that converts an electrical signal into an audible sound; also known as a loudspeaker.

As used in this disclosure, a "transceiver" may be a device that is used to transmit and/or receive signals. The signals may be audible, optical, or RF in nature.

As used in this disclosure, a "transducer" may be a device that converts a physical quantity, such as pressure or brightness into an electrical signal or a device that converts an electrical signal into a physical quantity.

As used in this disclosure, "USB" may be an acronym for Universal Serial Bus which refer to one or more industry standards that defines the cables, the connectors, the communication protocols, and the distribution of power required for interconnections between electronic devices. The USB standards define several connectors including, but not limited to, USB-A, USB-B, USB-C, mini-USB, and micro USB connectors.

As used in this disclosure, "wireless" may be an adjective that is used to describe a communication channel that does not require the use of physical cabling.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A drink-locating band comprising:
a locator, a band, and a software application;
wherein the locator detachably couples to a drink container via the band;
wherein the locator is adapted to be activated by a user via the software application executing on a smart phone;
wherein responsive to being activated, the locator plays an audio stream, illuminates one or more visual indicators, or both in order to annunciate the location of the drink container;
wherein the locator comprises locator circuitry within a housing;
wherein the locator circuitry comprises a microcontroller, a transceiver, a sound transducer, the one or more visual indicators, and a battery;
wherein the microcontroller is a central processing unit with memory and I/O ports;
wherein the microcontroller communicates with the transceiver, the sound transducer, and the one or more visual indicators via the I/O ports;
wherein the microcontroller executes instructions stored within the memory of the microcontroller to pair the transceiver with the smart phone, to play the audio stream via the sound transducer, and to illuminate and extinguish the one or more visual indicators;

wherein the band is a two-piece band;

wherein the two-piece band comprises a first band portion coupled to a first lug of the housing via a first pin and a second band portion coupled to a second lug of the housing via a second pin;

wherein the free ends of the first band portion and the second band portion overlap and detachably couple via a hook and loop fastener.

2. The drink-locating band according to claim 1 wherein the transceiver is a wireless communication device;

wherein the transceiver pairs with the smart phone to send information from the locator to the smart phone and from the smart phone to the locator via a wireless communication channel.

3. The drink-locating band according to claim 2 wherein the information encodes commands to the locator.

4. The drink-locating band according to claim 3 wherein the sound transducer converts an electrical signal into the audio stream.

5. The drink-locating band according to claim 4 wherein the sound transducer is one or more loudspeakers or one or more piezoelectric transducers;

wherein the electrical signal is modulated by the microcontroller;

wherein responsive to an activation command received from the smart phone, the microcontroller plays the audio stream through the sound transducer.

6. The drink-locating band according to claim 5 wherein the audio stream exits the housing via a grill located on the housing.

7. The drink-locating band according to claim 6 wherein the grill comprises a plurality of grill apertures.

8. The drink-locating band according to claim 6 wherein the one or more visual indicators are one or more LEDs;

wherein responsive to the activation command received from the smart phone, the microcontroller illuminates the one or more visual indicators, extinguishes the one or more visual indicators, varies the brightness of the one or more visual indicators, or any combination thereof;

wherein the one or more visual indicators are visible from outside of the housing.

9. The drink-locating band according to claim 8 wherein the audio stream and the one or more visual indicators are deactivated by explicit command from the smart phone or after expiration of a predetermined timeout.

10. The drink-locating band according to claim 9 wherein the battery comprises one or more energy-storage devices;

wherein the battery is a source of electrical energy to operate the microcontroller, the transceiver, the sound transducer, and the one or more visual indicators;

wherein the battery is recharged via a recharging port.

11. The drink-locating band according to claim 10 wherein the recharging port is a female Type C USB connector.

12. The drink-locating band according to claim 10 wherein the locator circuitry further comprises a GPS chip;

wherein the GPS chip is a Global Positioning System receiver;

wherein the GPS chip receives a plurality of radio signals from satellites in the constellation of GPS satellites;

wherein the GPS chip performs calculations to determine geolocation and time information;

wherein the GPS chip delivers the geolocation information, the time information, or both to the microcontroller;

wherein responsive to a locate command received from the smart phone, the locator sends location data derived from the geolocation information to the software application executing on the smart phone;

wherein the software application displays the location data on the screen of the smart phone as a direction and distance to the locator, overlaid on a map, or both.

13. The drink-locating band according to claim 10 wherein the band holds the locator in place on the drink container.

14. The drink-locating band according to claim 13 wherein a hook portion of the hook and loop fastener is coupled to the front face of the first band portion and a loop portion of the hook and loop fastener is coupled to the rear face of the second band portion.

15. The drink-locating band according to claim 13 wherein the band is a one-piece band;

wherein the one-piece band is made of an elastic material that stretches during installation and removal of the drink-locating band;

wherein the one-piece band surrounds at least the rear and four contiguous sides of the locator, leaving the front of the locator exposed.

16. The drink-locating band according to claim 15 wherein the one-piece band is selected from a plurality of sizes to fit a specific size of the drink container.

17. The drink-locating band according to claim 13 wherein the software application executes on the smart phone in order to control and/or monitor status of the locator;

wherein the software application presents a user interface on the screen of the smart phone;

wherein the software application is adapted for the user to send the commands to activate and deactivate the sound transducers and the one or more visual indicators, to select a specific audio track to play through the sound transducers, and to acquire and display the location data for the locator.

* * * * *